United States Patent [19]

Attane

[11] Patent Number: 4,609,072
[45] Date of Patent: Sep. 2, 1986

[54] CONNECTING DEVICE BETWEEN A LUBRICATED MOTOR AND A ROTATING ELECTRIC MACHINE

[75] Inventor: Jacques Attane, Issy les Moulineaux, France

[73] Assignee: Auxilec, Colombes, France

[21] Appl. No.: 728,418

[22] Filed: Apr. 29, 1985

[30] Foreign Application Priority Data

Feb. 28, 1985 [FR] France ................................ 85 02968

[51] Int. Cl.$^4$ ............................................ F01M 11/00
[52] U.S. Cl. ................................ 184/6.11; 184/6.27; 277/14 R
[58] Field of Search .................. 184/6.11, 6.27, 106, 184/109; 60/39.142; 384/135, 478; 277/13, 14 R, 67, 68

[56] References Cited

U.S. PATENT DOCUMENTS

| | | | |
|---|---|---|---|
| 1,084,192 | 1/1914 | Becker et al. | 184/6.13 X |
| 2,306,724 | 12/1942 | Gouldthorpe . | |
| 2,319,549 | 5/1943 | Lawrence | 74/270 |
| 2,441,844 | 5/1948 | Rhoads | 277/67 X |
| 2,714,045 | 7/1955 | Simenson | 277/13 X |
| 3,493,776 | 2/1970 | Porter | 290/31 |
| 4,525,995 | 7/1985 | Clark | 184/6.11 X |

FOREIGN PATENT DOCUMENTS

| | | | |
|---|---|---|---|
| 2505554 | 2/1975 | Fed. Rep. of Germany . | |
| 1192227 | 10/1959 | France . | |
| 662150 | 12/1951 | United Kingdom | 277/67 |
| 1179440 | 1/1970 | United Kingdom . | |

*Primary Examiner*—Leonard E. Smith
*Attorney, Agent, or Firm*—Pollock, VandeSande & Priddy

[57] ABSTRACT

The connecting device is interposed between a rotating electric machine and a toothed lubricated device of the speed-reducer or multiplier type, this device comprising an output shaft of the electric machine, a screen, for opposing the propagation, towards the electric machine, of eventual lubricant leak in the vicinity of the shaft of the toothed device, closes, on one side, a cavity at the end of the casing of this toothed device and whereby this cavity presents on its lower portion an outlet hole for discharging the lubricant leaks, and the rotating screen presents a cylindrical projection directed towards the inside of the cavity and disposed so as to deviate towards the discharge hole the lubricant particles escaping from the toothed device. Application to the connection of the electric starter with an aeroplane or helicopter motor.

4 Claims, 1 Drawing Figure

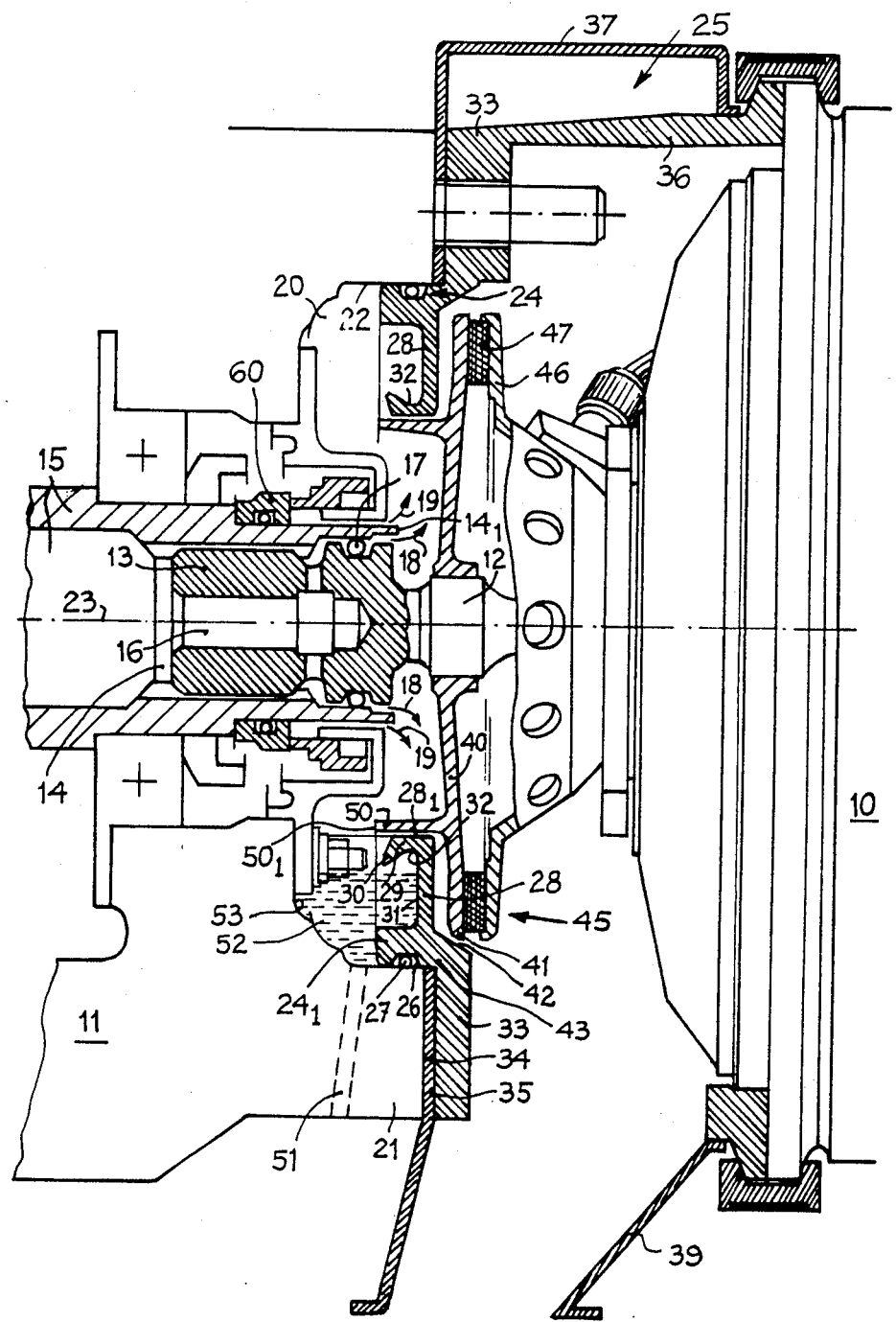

CONNECTING DEVICE BETWEEN A LUBRICATED MOTOR AND A ROTATING ELECTRIC MACHINE

BACKGROUND OF THE INVENTION

The invention concerns a connection device between a lubricated motor and a rotating electric machine, this device comprising a screen in order to prevent propagation of the lubricant towards the vicinity of the electric machine.

BACKGROUND OF THE PRIOR ART

The starting of the compressor of the turbine in aeroplanes or helicopters is carried out by using an electric motor which, after starting has been achieved, is utilized as an electricity generator. In general, the compressor rotates at a speed distinctly faster than that which could be supported by the motor-generator assembly (hereinafter referred to, for simplicity's sake, as "the starter"). This is the reason why a meshing or gearing device is foreseen to serve as a speed-multiplier during starting and as a speed-reducer during normal running.

The functioning of the starter could be disturbed by lubricating oil leaks issuing from the gearing device.

Until now, in order to prevent these leaks, a screen mounted on the output shaft of the starter has been foreseen that closes, on one side, a cavity at the end of the gear-case or casing of the gearing device, and this cavity has, on its lower portion, an outlet hole for discharging said lubricant. This screen, which can be in the shape of a disk, forms, for example, the armature of a damping device or vibration and/or shock-absorber in torque.

But, it has been observed that these measures can, for important leaks, be only partially effective.

BRIEF DESCRIPTION OF THE INVENTION

The present invention allows to reduce to a large extent the risks of propagation of the lubricating oil towards the vicinity of the starter.

One object of the present invention is that the rotating screen is directed towards the inside of the cavity and disposed so as to deviate towards the outlet hole the particles of the lubricant escaping from the periphery of the shaft of the gearing device. The invention results, in fact, from the observation that in the connecting devices of the prior art, the lubricant particles escape from the periphery of the shaft and are carried along to the periphery of the screen by centrifugal force created by the rotation, and they thus surround the screen and are propagated towards the vicinity of the starter through the clearance that is necessarily provided between the periphery of this rotating screen and the inside surface of an attachment clip mounted at the end of the casing of the gearing device.

In one preferred embodiment of the invention, the projection is cylindrical, having the same axis as the shaft. In this case, in order to further reduce the risks of propagation of the lubricant, the attachment clip or clamp of the starter terminates in a nose-piece penetrating a cavity and to this nose-piece is attached, towards the inside of the cavity, a wall having an opening, the edge of which is separated by a small distance, for example about 0.8 mm, from the periphery of the cylindrical projecting wall of the rotating screen. Thus between the periphery of the shaft and the periphery of the screen are formed baffled elements that render effectively more difficult the propagation of the particles of lubricant towards the periphery of the screen. Furthermore, the wall of the attachment clip of the starter increases, at the lower portion, the volume of the lubricant that can be accumulated, prior to its evacuation through the discharge hole, thereby further reducing the risks of propagation of the lubricant towards the vicinity of the starter.

In one variation the opening of the wall of the attachment clip of the starter has, directed towards the vicinity of the gearing device, an edge in the form of a spout or shoot so as to guide towards the discharging hole the particles projected by the centrifugal force against the wall.

BRIEF DESCRIPTION OF THE DRAWING

Other objects, features and advantages of the invention will become apparent from reading the following description of one of its embodiments, given with reference to the single drawing which is a diagram in an axial cross-section of a connecting device according to the invention, the starter and the toothed reducer-multiplier device being partially represented.

The following example is described with reference to an electric starter for aeroplane or helicopter turbine engines, this starter also functioning as an electricity generator once starting has been achieved.

The figure represents the end of electric starting motor 10 as well as the end of toothed reducer-multiplier device 11, interposed between starter 10 and the compressor (not represented) of the turbine of the aeroplane.

The connection of output shaft 12 of starter 10 to the shaft of device 11 is obtained by foreseeing that shaft 12 presents an end 13 with slots of axial direction penetrating the complementary grooves inside an opening 14 at the end of shaft 15 of device 11. Furthermore, shaft 12 presents an end cavity 16 intended to ensure the lubrication of end 13 of shaft 12. At the vicinity of the end of shaft 15 is provided, between the inside surface of opening 14 and shaft 12 a sealing ring 17 in order to prevent the propagation of the lubricating oil of device 11 towards starter 10. But oil leaks are, normally, unavoidable. Furthermore, arrows 18 represent the direction and flow sense of the oil leaks issuing from opening or cavity 14. Oil, also generally escapes by the periphery of shaft 15 as represented by arrows 19; this oil issues from a rotating sealing ring 60 assembled on shaft 15.

Shaft 15 terminates inside a central cavity 20 that has an end 21 of the casing of device 11. The cavity 20 is limited by a cylindrical wall 22 having the same axis 23 as shafts 12 and 15 and receives end 24 of an attachment clip 25 of starter 10.

End 24 has the shape of a nose-piece at the external cylindrical surface with a peripheral groove 26 housing a sealing ring 27, which is also applied against cylindrical surface 22.

To cylindrical wall $24_1$ of the end of the clip is attached, according to the invention, a wall 28 perpendicular to axis 23 with a circular opening $28_1$ of a diameter substantially larger than the outside diameter of shaft 15 at its end. Opening 28 presents, towards the inside of cavity 20, an annular flange 29 with a return 30 distancing away from axis 23 in a delimited manner, between face 31 of wall 28 that is directed towards recess 20 and this return 30, a spout 32 the purpose of which will be explained hereinbelow.

End 24 of clip 25 is attached to a wall 33, also forming part of clip 25, that is applied against end face 34 of casing 21 of device 11 through the intermediary of a metal plate 35, that is fixed against face 34 forming part of a cover or cowling 37. Wall 33 is connected to the end of the housing of starter 10 by arms 36 forming a sleeve and which are surrounded by cover 37 sheet metal which terminates with said plate 35. This cover 37 is open on its lower portion and is extended by an aeration vent 39 made of a single piece with cover 37 and plate 35.

Shaft 12 is coaxial with slotted end 13 a disk 40 includes annular wall 50 having a diameter slightly smaller than that of opening 28 with a periphery 41 at a small distance away from bevelled face 42 limiting the connecting part 43 of nose-piece 24 to wall 33.

Disk 40 forms an armature of dampener 45 that comprises a second armature 46 with a crown of substantially the same diameter as disk 40 and separated from said disk by active element 47 of the dampening in torque.

According to the invention, disk 40, which constitutes a screen closing cavity 20 to be opposed to the propagation of the particles of lubricant towards the vicinity of starter 10, is projecting, towards the inside of cavity 20, a cylindrical wall 10 having an axis 23, the outside diameter of which is very slighty smaller than the diameter of opening $28_1$. In the example, the distance between the external surface of cylinder 50 and the edge of opening 28 is about 0.8 mm. In this example, the distance separating wall 28 from disk 40 is about 3 mm and cylindrical wall 50 is, inside cavity 20, slightly projecting with respect to edge 29. Shaft 15 slightly projects inside cavity 20 to the extent that its end $14_1$ is closer to starter 10 than end $50_1$ of wall 50.

Furthermore, at its lower portion, the end of casing 21 comprises a outlet hole 51 to discharge oil 52 that can be accumulated in the lower portion of cavity 20. In this lower portion of cavity 20 is thus formed a tank limited by a vertical wall that is constituted by the lower portion of wall 28 and another vertical wall 53 of casing 21.

The system functions as follows:

When the lubricant leaks occur oil droplets escape from device 11 with a course that begins according to arrows 18 and 19. The rotation provokes a centrifugal force that projects these droplets onto the inside surface of cylindrical wall 50 and towards surface 22 (nonrotating) as well as towards the inside surface of wall 28 (which is also non-rotating). In the upper portion the oil tends to gather together in spout 32 from which it is guided towards the lower portion in order to flow into the above-mentioned tank from which it is discharged through outlet hole 51.

Thus, wall 50 constitutes an obstacle to be opposed to the propagation of the oil towards periphery 41 of disk 40, i.e. towards starter 10.

Furthermore, this cylindrical wall 50 with edge 29 constitutes baffle elements which also oppose the propagation of the oil towards starter 10. It should also be noted that wall 28, which was not foreseen in connecting devices of the prior art, increases the volume of the oil accumulation tank at the lower portion, which is also favorable to minimizing propagation. Further, the invention can also be applied to opposing the propagation of oil towards starter 10 when the motor is cut out.

I claim:

1. A connecting device between an electric rotating machine and a lubricated device of the speed-reducer or multiplier type comprising, integral with an output shaft of the electric machine, a rotating screen opposed to the propagation towards the electric machine, of eventual leaks of lubricant in the vicinity of the shaft of the lubricated device, closing, on one side, a cavity at the end of a casing of the lubricated device, this cavity presenting, on its lower portion, an outlet hole for discharging the lubricant leaks, wherein the screen has a projection directed towards the inside of the cavity and disposed so as to deviate towards the outlet hole the particles of lubricant that escape from the lubricated device, the projection being a cylindrical wall having the same axis as the shaft of the electric machine, and wherein the electric machine includes a clip attached to the lubricated device which terminates by a nose-piece end penetrating the cavity, to this nose is attached, towards the inside of the cavity, a wall presenting an opening, the edge of which is separated by a small distance, for example, about 0.8 mm, from the periphery of the cylindrical wall projecting from the rotating screen.

2. Device according to claim 1, wherein the opening of the wall integral with the nose piece presents an edge directed towards the lubricated device.

3. Device according to claim 2, wherein the edge presents an end outwardly curved so as to form a spout for guiding the lubricant towards the outlet hole.

4. Device according to claim 2 or 3, wherein, in the cavity, the cylindrical cavity projecting from the screen exceeds the edge in the direction of the lubricated device.

* * * * *